US007286225B2

(12) United States Patent
Aikawa

(10) Patent No.: US 7,286,225 B2
(45) Date of Patent: Oct. 23, 2007

(54) OPTICAL FIBER TYPE SPECTROSCOPE AND SPECTROSCOPE SYSTEM EQUIPPED THEREWITH

(75) Inventor: Naoshi Aikawa, Fujisawa (JP)

(73) Assignee: Nikon Corporation, Tokyo (JP)

( * ) Notice: Subject to any disclaimer, the term of this patent is extended or adjusted under 35 U.S.C. 154(b) by 141 days.

(21) Appl. No.: 11/289,315

(22) Filed: Nov. 30, 2005

(65) Prior Publication Data
US 2006/0114459 A1 Jun. 1, 2006

(30) Foreign Application Priority Data
Nov. 30, 2004 (JP) ............................. 2004-347671

(51) Int. Cl.
G01J 3/04 (2006.01)
G01J 3/18 (2006.01)
G01N 21/64 (2006.01)
(52) U.S. Cl. ...................................... 356/328; 356/318
(58) Field of Classification Search ................ 356/326, 356/328

See application file for complete search history.

(56) References Cited

U.S. PATENT DOCUMENTS
6,909,542 B2 * 6/2005 Sasaki ........................ 359/385

FOREIGN PATENT DOCUMENTS
JP 9-210783 8/1997
JP 2002-267933 9/2002
WO WO97/25915 * 7/1997

* cited by examiner

Primary Examiner—F. L. Evans
(74) Attorney, Agent, or Firm—Miles & Stockbridge PC

(57) ABSTRACT

A spectroscope includes an optical fiber 218, a collimator optical system 231 for collimating signal light come out from the optical fiber 218, a spectroscopic element 233 for dispersing the signal light collimated by the collimator optical system 231, a detector 237 composed of a plurality of detector elements 237a disposed at least in a direction of dispersion and detecting the light dispersed by the spectroscopic element 233, and a focusing optical system 236 for focusing the signal light come out from the detector 237 onto a detecting surface of the detector 237. It is set such that the focusing optical system 236 makes a diameter of a spot of the signal light focused on the detecting surface of the detector 237 smaller than an arranged pitch of the detector 237 and a numerical aperture of the collimator optical system 231 is larger than that of the optical fiber 218.

20 Claims, 4 Drawing Sheets

OPTICAL FIBER TYPE SPECTROSCOPE AND SPECTROSCOPE SYSTEM EQUIPPED THEREWITH

The disclosures of the following priority application is herein incorporated by reference:

Japanese Patent Application No. 2004-347671 filed on Nov. 30, 2004.

BACKGROUND OF THE INVENTION

1. Field of the Invention

The present invention relates to an optical fiber type spectroscope and a spectroscope system equipped therewith.

2. Related Background Art

As described in Japanese Patent Application Laid-Open No. 9-210783, a spectroscope has been known in which an input slit is disposed right behind an exit end of an optical fiber for connecting to a spectroscope. A bundle of rays passed through the input slit is collimated by a collimator optical system, incident on a diffraction grating to be dispersed in a given direction with each wavelength, focused by a focusing optical system, and incident on a one-dimensional detector disposed in a direction of dispersion. The structure is called as a Czerny-Turner type in which the magnification from the input slit to the detector is generally one.

However, in the above-described spectroscope, a signal light is limited by the input slit so as to accomplish a given spectral resolution. Moreover, a signal light is also limited by narrowing the input slit in order to improve aberrations of the collimator optical system and the focusing optical system. Therefore, not all the signal light from the optical fiber can be effectively used.

SUMMARY OF THE INVENTION

The present invention is made in view of the aforementioned problems and has an object to provide an optical fiber type spectroscope capable of dispersing a signal light input from an optical fiber by a spectroscopic element without losing sensitivity.

According to a first aspect of the present invention, there is provided a spectroscope including an optical fiber on which light is incident, a collimator optical system that collimates the light come out from the optical fiber, a spectroscopic element that disperses the light collimated by the collimator optical system, a detector that is composed of a plurality of detector elements disposed at least in a direction of dispersion and that detects the light dispersed by the spectroscopic element, and a focusing optical system that focusing signal light from the spectroscopic element onto a detecting surface of the detector, wherein the following conditional expression is satisfied:

$$NAfiber \leq NAf \times (ff/fc)$$

where NAfiber denotes a numerical aperture of the optical fiber, NAf denotes a numerical aperture of the focusing optical system, ff denotes a focal length of the focusing optical system, and fc denotes a focal length of the collimator optical system.

In the spectroscope according to the first aspect of the present invention, it is preferable that the numerical aperture of the signal light incident on the detector element is denoted by $NAfiber \times (fc/ff)$ which is corresponding to an incident angle range where the detecting sensitivity is 90% or more of the maximum value.

In the spectroscope according to the first aspect of the present invention, it is preferable that the numerical aperture of the signal light incident on the detector element is denoted by $NAfiber \times (fc/ff)$ which is corresponding to an incident angle range where the detecting sensitivity is 95% or more of the maximum value.

In the spectroscope according to the first aspect of the present invention, it is preferable that the focusing optical system makes a diameter of a spot of the signal light focused on the detecting surface of the detector smaller than an arranged pitch of the detector elements of the detector.

In the spectroscope according to the first aspect of the present invention, it is preferable that a numerical aperture of the collimator optical system is larger than that of the optical fiber.

In the spectroscope according to the first aspect of the present invention, it is preferable that the collimator optical system includes a cemented lens.

In the spectroscope according to the first aspect of the present invention, it is preferable that the collimator optical system is composed of a first lens group and a second lens group, the fist lens group has positive refractive power, and the second lens group includes a cemented lens for correcting spherical aberration and chromatic aberration generated in the first lens group.

In the spectroscope according to the first aspect of the present invention, it is preferable that the collimator optical system includes a three-piece cemented lens.

In the spectroscope according to the first aspect of the present invention, it is preferable that the collimator optical system includes an aspherical mirror.

In the spectroscope according to the first aspect of the present invention, it is preferable that the collimator optical system includes a parabolic mirror.

According to the second aspect of the present invention, there is provided a microspectroscope including, an optical fiber on which light come out from a microscope is incident, a collimator optical system that collimates the light come out from the optical fiber, a spectroscopic element that disperses the light collimated by the collimator optical system, a detector that is composed of a plurality of detector elements disposed at least in a direction of dispersion and that detects the light dispersed by the spectroscopic element, and a focusing optical system that focusing signal light from the spectroscopic element onto a detecting surface of the detector, wherein the following conditional expression is satisfied:

$$NAfiber \leq NAf \times (ff/fc)$$

where NAfiber denotes a numerical aperture of the optical fiber, NAf denotes a numerical aperture of the focusing optical system, ff denotes a focal length of the focusing optical system, and fc denotes a focal length of the collimator optical system.

In the spectroscope according to the second aspect of the present invention, it is preferable that the optical fiber is a multimode optical fiber.

In the spectroscope according to the second aspect of the present invention, it is preferable that the microscope is a confocal microscope that includes on the exit side a pinhole and a relay lens that converges a divergent bundle of rays passed through the pinhole, and the light incident on the optical fiber is fluorescence come out from a microscope sample incident on the optical fiber through the pinhole and the relay lens.

In the spectroscope according to the second aspect of the present invention, it is preferable that a numerical aperture of the collimator optical system is larger than that of the optical fiber.

In the spectroscope according to the second aspect of the present invention, it is preferable that the focusing optical system makes a diameter of a spot of the signal light focused on the detecting surface of the detector smaller than an arranged pitch of the detector elements of the detector.

In the spectroscope according to the second aspect of the present invention, it is preferable that the collimator optical system includes an aspherical mirror.

In the spectroscope according to the second aspect of the present invention, it is preferable that the optical fiber is a multimode optical fiber, the numerical aperture of the signal light incident on the detector element is denoted by NAfiber×(fc/ff) which is corresponding to an incident angle range where the detecting sensitivity is 90% or more of the maximum value, and the focusing optical system makes a diameter of a spot of the signal light focused on the detecting surface of the detector smaller than an arranged pitch of the detector elements of the detector.

Other features and advantages according to the invention will be readily understood from the detailed description of the preferred embodiment in conjunction with the accompanying drawings.

DESCRIPTION OF THE MOST PREFERRED EMBODIMENTS

Embodiments of the present invention are explained below with reference to accompanying drawings.

First Embodiment

Figure 1:
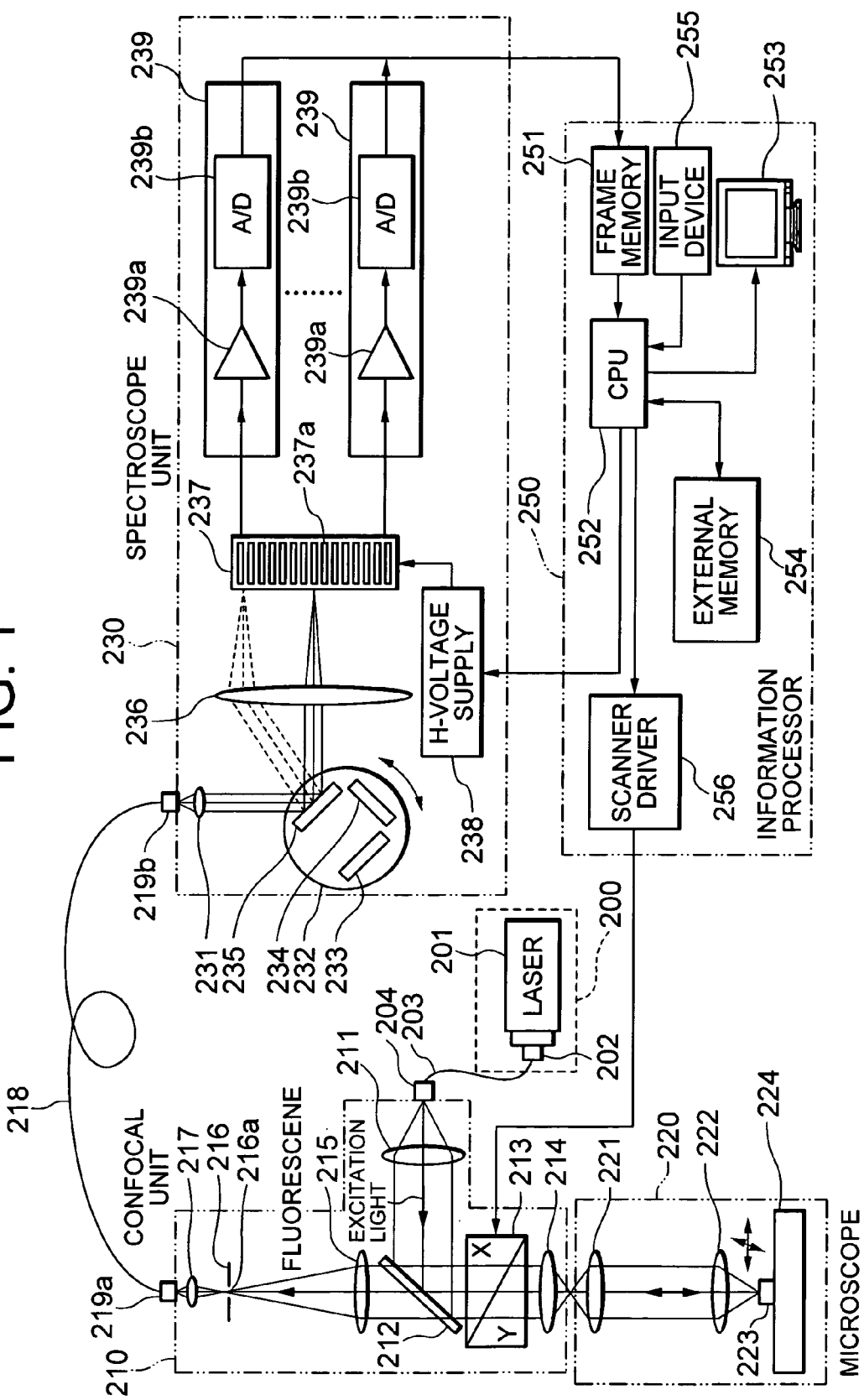
FIG. 1 is a block diagram showing an example of a spectroscope system according to a first embodiment of the present invention.

A spectroscope system according to a first embodiment of the present invention is shown in FIG. 1.

The spectroscope system shown in FIG. 1 includes a confocal microscope, a spectroscope unit 230, and an information processor 250. The confocal microscope is composed of a light source system 200, a confocal unit 210, and a microscope 220. The confocal unit 210 and the spectroscope unit 230 are optically connected by an optical fiber 218 through fiber couplers 219a and 219b.

The light source system 200 includes a laser 201, an optical fiber 203, and fiber couplers 202 and 204. The laser 201 is equipped with, for example, a laser diode and emitting illumination light with a specific spectral characteristics. The illumination light is led to the confocal unit 210 through the optical fiber 203. In the example shown in FIG. 1, the laser 201 emits an excitation light as the illumination light for exciting a sample to emit fluorescence.

The confocal unit 210 includes a collimator lens 211 for collimating the illumination light from the light source system 200, a dichroic mirror 212, a scanner unit 213, a scanner lens 214, a focusing lens 215, a pinhole plate 216 on which a pinhole 216a is formed, and a relay lens 217.

The microscope 220 is composed of a first objective lens 222, a second objective lens 221, and a stage 224 on which a sample 223 is placed. The confocal microscope constructed by combining the confocal unit 210 and the microscope 220.

The spectroscope unit 230 includes a collimator optical system 231 for collimating an observation light (fluorescence in the example shown in FIG. 1) incident from the optical fiber 218, diffraction gratings 233, 234, and 235 which are dispersing optical elements having three different dispersion characteristics with each other, a rotation table 232 on which these diffraction gratings are placed and rotated, a detector 237 on which a plurality of detector elements 237a are arranged in an array shape, a focusing optical system 236 for imaging the diffracted light come out from any one of diffraction gratings 233 to 235 onto a detecting surface of the detector 237, a high voltage supply 238 for driving the detector 237, and a detector circuit 239 for amplifying and converting the output of each detector element 237a into digital value, and outputting it as a detected data. Incidentally, optical systems disposed prior to the detector such as the collimator optical system 231 and the focusing optical system 236 are formed such that a numerical aperture NA of the signal light incident on the detector element 237a becomes within the range of effective numerical aperture NA or the optimum numerical aperture NA of the detector element 237a.

The information processor 250 includes a frame memory 251 for storing the detected data output from the detector circuit 239, a central processing unit (CPU) 252 for calculating spectral characteristics to be obtained on the basis of the detected data stored in the frame memory, a display 253, an external memory 254, an input device 255, and a scanner driver 256. Not shown in FIG. 1, the CPU 252 includes a calculating portion and a main memory. As for the display 253, for example, a liquid crystal display is used. As for the external memory 254, such as a hard disk, a magneto-optical disk, a semiconductor memory, or the like is used. As for the input device 255, for example, a keyboard, a mouse, and the like are included.

In the external memory 254, operating programs and various kinds of data for the CPU 252 are stored. Specifically, the external memory 254 has a function as a memory storing spectral characteristics corresponding to each optical element of a plurality of optical elements. Programs and data given in advance are stored in the external memory 254 by reading out and installing from a memory such as a CD-ROM, or the like by using a reader (not shown).

The CPU 252 loads a program stored in the external memory 254 and carries out various controls and calculations. The external memory 254 includes programs which make the CPU 252 work such as a calculation means that calculates spectral characteristics based on the data obtained from the object to be measured, an identification means that accepts to identify the optical elements including in the optical system to be used, and an obtaining means that obtains spectral characteristics of the object to be measured by using the spectral characteristic data output from the spectroscope unit 230 and the spectral characteristic information of the optical element to be used read out from the memory based on the information of the optical element identified by the identification means. Moreover, the external memory 254 also includes a program which makes the CPU 252 work as a memory means that stores each spectral characteristics of a plurality of optical elements corresponding to each optical element together with the memory itself.

Further explanation regarding the spectroscope unit 230 is provided below. The spectroscope unit 230 introduces the observing light through the optical fiber 218, disperses the light by any one of diffraction gratings 233 through 235, and detects the dispersed light by each detector element 237a of the detector 237.

As shown in FIG. 1, the optical fiber 218 is connected to the spectroscope unit 230 through the fiber coupler 219b. The whole bundle of rays of the signal light from the optical fiber 218 is collimated by the collimator optical system 231, and incident on a diffraction grating selected from the diffraction gratings 233 through 235. The signal light incident on the diffraction grating is dispersed in each direction of diffraction according to each wavelength. The dispersed signal light is focused by the focusing optical system 236, forms images on the detecting surface of the detector 237, and is input to the detector 237. Electric signal corresponding to the light quantity incident on each detector element 237a is output from the detector 237, so that spectral signal which is light intensity relative to wavelength can be obtained by processing by the information processor 250.

The respective diffraction gratings 233, 234, and 235 have different number of grooves with each other. These gratings are arranged on the rotation table 232 with different angles with each other. The wavelength range detected by the detector can be changed by rotating the rotation table 232 changing the incident angle to the diffraction grating. Moreover, by changing a diffraction grating to another one, spectral resolution can be changed.

The optical fiber 218 is a step index type and has a core diameter of 50 μm, a numerical aperture NA of 0.22. The output light from the optical fiber 218 through the fiber coupler 219b is led to the spectroscope unit 230. In the first embodiment of the present invention, the light is led to the dispersing optical system through the collimator optical system 231. In the spectroscope according to the first embodiment of the present invention, the collimator optical system 231 deals with very weak light signal. In order to obtain a high S/N ratio, it is necessary that the light signal introduced by the optical fiber 218 has to be used with high efficiency. Accordingly, the role of the collimator optical system 231 is to import the signal light (diverging light) to lead to the diffraction grating 233, 234, or 235, which is the succeeding element, without loss (blocking or wasting).

Figure 2:
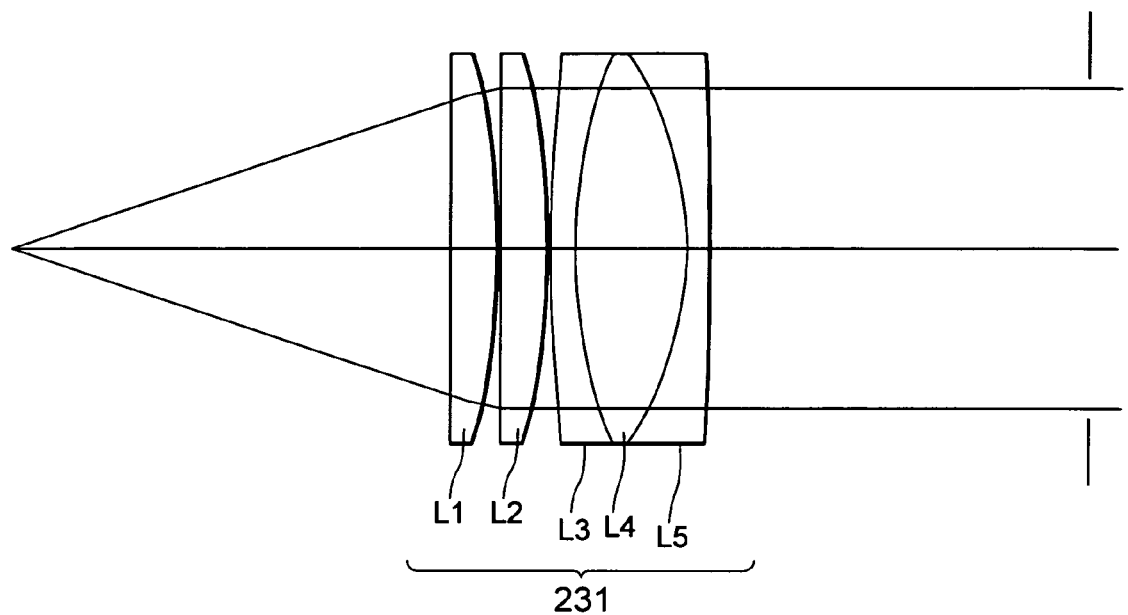
FIG. 2 is an explanatory view showing a configuration of a collimator lens as an example of a collimator optical system.

In the first embodiment of the present invention, a combined lens system is used as the collimator optical system 231 shown in FIG. 2. The collimator optical system 231 shown in FIG. 2 is composed of five lens elements L1 through L5.

The collimator optical system 231 is composed of, in order from an object (from the optical fiber end side), a first lens group and a second lens group. The first lens group is composed of two plano-convex lenses L1 and L2 each having a plane surface facing to the object. The second lens group is composed of a three-piece cemented lens constructed by, in order from the object, a negative meniscus lens L3, a double convex lens L4, and a negative meniscus lens L5. Lens data of the collimator optical system is shown in Table 1, where r denotes a radius of curvature (mm) of a lens surface, d denotes a distance between lens surfaces (mm), and nd and vd respectively denote refractive index and Abbe number of a glass material of each lens at d-line. Reference symbol f denotes the focal length at d-line, d0 denotes a distance along the optical axis between the object (the end of the optical fiber) and a first surface, and NA denotes a numerical aperture.

TABLE 1 f = 32.1 mm
d0 = 28.757 mm
NA = 0.251

| | r | d | nd | vd |
|---|---|---|---|---|
| 0 | | 28.8 | | |
| 1 | ∞ | 3.0 | 1.49782 | 82.52 |
| 2 | −29.800 | 0.2 | | |
| 3 | ∞ | 3.0 | 1.49782 | 82.52 |
| 4 | −29.800 | 0.2 | | |
| 5 | +87.000 | 1.5 | 1.80400 | 46.57 |
| 6 | +22.400 | 7.0 | 1.49782 | 82.52 |
| 7 | −14.700 | 1.5 | 1.51680 | 64.10 |
| 8 | −125.000 | 24.0 | | |

The first lens group has positive refractive power and a role for converging the diverging light from the optical fiber and substantially collimating the light. On the other hand, the second lens group has weak negative refractive power and a role for correcting spherical aberration and chromatic aberration produced in the first lens group. Chromatic aberration in particular is greatly corrected by the cemented surface, which has a large difference in refractive index and Abbe number, between the lens L3 and the lens L4, and the correction error at the same cemented surface is corrected by the lenses L4 and L5. Accordingly, chromatic aberration is approximately corrected over wide wavelength range from h-line (404.7 nm) to A-line (768.2 nm).

By the way, in the first embodiment of the present invention, since sine condition is also corrected preferably, the bundle of rays come out from the object plane having a dimension of about a diameter of the core (50 μm) of the optical fiber can be preferably collimated.

All of the outer diameters of the lenses L1 through L5 composing the collimator optical system are 19.5 mm. Each effective diameter (the minimum diameter which gives no wane in the bundle of rays) is 18 mm. In this case, the collimator optical system has a numerical aperture NA of at least 0.25, so that it is larger than the numerical aperture NA of the optical fiber to be used of 0.22. Accordingly, all of the bundle of rays come out from the optical fiber can be preferably collimated, so that the bundle of rays can be used without loss.

The detector 237 is a multi-anode type photomultiplier tube (PMT) with 32 channels, the dimension of each channel is about 0.8 mm by 7 mm, and the respective channels are arranged in the wavelength dispersing direction up to 32 channels with a pitch P (=1 mm).

In the first embodiment of the present invention, a focusing lens is used as the focusing optical system 236. As long as the size of the image Sp (an image of the core of the optical fiber) of the signal light on the detecting surface of the detector 237 is smaller than the dimension in the dispersing direction of the detector element 237a of the detector 237 or the pitch P, a high spectral resolution corresponding to the number of the elements of the detector 237 can be obtained. Moreover, when the aberrations of the optical system is taken into consideration, the dimension of the image of the signal light is better to be smaller than this. The focusing lens forms an image such that the dimension of the image Sp of the light come out from the diffraction grating on the detector 237 is smaller than the pitch P.

Then, the movement of the first embodiment of the present invention is explained with reference to FIG. 1. In this embodiment, the sample 223 to be observed is illuminated by the laser light, the fluorescence excited on the sample 223 is captured by the microscope and led to the spectroscope unit 230, and spectral data is obtained. The procedures for measuring and observing are approximately described below.

Laser light (excitation light) emitted from the laser 201 as a light source is entered into the optical fiber 203 through the fiber coupler 202. The other end of the optical fiber 202 is connected to the confocal unit 210 installed in the microscope 220 through the fiber coupler 204. The laser light come out from an end of the optical fiber 203 is collimated by the collimator lens 211, reflected by the dichroic mirror 212, introduced into the scanner unit 213 constructed by orthogonally disposed two galvanometers and a scanner lens 214, and scanned two-dimensionally. The scanned laser light passes through the second objective lens 221, converged by the objective lens 222, and focused on a point on the sample 223. Fluorescence emitted from the sample 223 is collected by the objective lens 222, and led to the dichroic mirror 212 along the opposite path of the excitation light. The fluorescence led to the dichroic mirror 212 passes through the dichroic mirror 212, and is focused by the focusing lens 215 onto the pinhole plate 216 on which a pinhole 216a is formed.

The light passed through the pinhole 216a is led to the fiber coupler 219a and the optical fiber 218 through the relay lens 217. The light passed through the pinhole 216a becomes a divergent bundle of rays unless otherwise the relay lens 217 is there, however with the relay lens 217 as shown in FIG. 1, the light is converged again onto the opening end of the optical fiber 218, even if it has seemingly small diameter, to be able to be effectively (without much loss) incident thereon.

Since the fiber coupler 219a is disposed further on the other side of the pinhole 216a, only the light passed through the pinhole 216a can reach the fiber coupler 219a through the relay lens 217. At this point, since the focused point formed on the pinhole 216a is an image of the light spot on the sample, even if any light emitted from the other point on the sample is there, the light is not focused on the pinhole 216a but blocked by the pinhole plate 216, hardly led to the fiber coupler 219a. As a result, the confocal microscope becomes a microscope capable of observing a sample with high longitudinal resolution as well as high lateral resolution.

The fluorescence incident on the fiber coupler 219a is introduced to the spectroscope unit 230 through the optical fiber 218. The fluorescence introduced to the spectroscope unit 230 is collimated by the collimator optical system 231, and incident on any one of the diffraction gratings 233, 234, or 235. In order to make the wavelength resolution variable, three kinds of the diffraction gratings are provided to be disposed on the rotation table 232 rotatably controlled by a pulse motor.

The fluorescence diffracted by the diffraction grating is focused by the focusing optical system 236, and incident on the detector 237 with a spreading angle corresponding to spectral resolution of the diffraction grating. The incident fluorescence is converted into an electric signal by the photoelectric effect of the detector element 237a. The converted electrical signal is amplified by an amplifier 239a, converted into a digital signal by an A/D converter 239b, sent to the frame memory 251, and calculated and processed by the CPU 252 to be displayed.

As for the optical fiber 218, a multimode fiber is suitable. For example, it may be considered that a single-mode fiber is used for leading a signal light from a pinhole of a confocal unit to a spectroscope. The merit for using the single-mode fiber (diameter of the core of the fiber is smaller than the diffraction limit of the pinhole) is considered that light using efficiency on the spectroscope side can generally be increased and accuracy in dispersion can also be improved. However, the light quantity of detected light on the spectroscope side cannot be increased by the single-mode fiber. For example, even if the diameter of the pinhole of the confocal microscope side is increased in order to increase the light quantity of detected light on the spectroscope side, the light quantity of detected light on the spectroscope side cannot be increased because of the single-mode fiber coming between the microscope and the spectroscope. Accordingly, in the fist embodiment of the present invention, a multimode fiber whose diameter of the core is larger tan that of the single-mode fiber is used.

At first, a device construction condition that the fluorescence is incident from the confocal unit 210 to the optical fiber 218 is explained.

The diameter of an Airy disk and a numerical aperture of the fluorescence focused on the pinhole plate 216 by the focusing lens 215 are denoted by Dem and NAem, respectively. The diameter of the core and a numerical aperture of the optical fiber 218 are denoted by Dfiber and NAfiber, respectively. The diameter of the pinhole 216a on the pinhole plate 216 is denoted by Dhole. Absolute value of the magnification of the relay lens 217 is denoted by $\beta$.

In this case, in order to use the confocal microscope in a state giving high resolution, the diameter of the pinhole 216a and the diameter of the Airy disk of the fluorescence are preferably satisfy the following conditional expression:

$$Dem \times 0.5 \leq Dhole \leq Dem \times 1.$$

In this case, when the following conditional expressions are satisfied, the signal light passed through the pinhole 216a can be effectively incident on the optical fiber 218:

$$Dfiber \geq Dem \times 1 \times \beta$$

$$NAfiber \geq NAem/\beta.$$

There is a case that when the signal light is very weak, the confocal microscope is used in a state giving a high signal-sensitivity somewhat sacrificing resolution. For this purpose, the diameter of the pinhole 216a and the diameter of the Airy disk of the fluorescence preferably satisfy the following conditional expression:

$$Dem \times 1 < Dhole \leq Dem \times 5.$$

In this case, by satisfying the following conditional expressions, the signal light passed through the pinhole 216a can be effectively incident on the optical fiber 218:

$$Dfiber \geq Dem \times 5 \times \beta$$

$$NAfiber \geq NAem/\beta.$$

Then, the device construction condition that the fluorescence is come out from the optical fiber 218 to the spectroscope 230 is explained. The focal length and the numerical aperture of the collimator optical system 231 are denoted by fc and NAc, respectively. The focal length and the numerical aperture of the focusing optical system 236 are denoted by ff and NAf, respectively. The pitch of the detector 237 is denoted by P and the length in the dispersion direction of a detecting area 237b of the detector 237 is denoted by L.

In this case, in order to use the spectroscope unit 230 at the upper limit of the spectral resolution limited by the pitch P of the detector 237, it is preferable that the dimension of the image of the optical fiber 218 on the detector 237 in the direction of dispersion is p or less. Moreover, since very weak fluorescence is treated, the exit light come out from the optical fiber 218 has to be led to the detector 237 with high efficiency.

In this case, high efficiency and high spectral resolution can be accomplished by satisfying the following conditional expressions:

$$D\text{fiber} \leq P \times (fc/ff)$$

$$NA\text{fiber} \leq NAc$$

$$NA\text{fiber} \leq NAf \times (ff/fc).$$

In this case, when the diameter of the focusing optical system 236 and that of the diffraction grating are made larger than that of respective incident bundles of rays, high efficiency can be accomplished.

Generally, the sensitivity of the detector 237 becomes maximum at normal incidence and decreases as the incident angle is getting larger. Here, an area of a numerical aperture NA where the detecting sensitivity is x % or more of the maximum value is denoted by NAx. In this case, by satisfying the following conditional expression, the fluorescence can be detected only by the area NAx:

$$NA\text{fiber} \leq NAx \times (ff/fc).$$

When NA90 is defined as an effective NA area where the detecting sensitivity is 90% or more of the maximum value, by satisfying the following conditional expression, only the effective NA area can be used:

$$NA\text{fiber} \leq NA90 \times (ff/fc).$$

When NA95 is defined as the optimum NA area where the detecting sensitivity is 95% or more of the maximum value, by satisfying the following conditional expression, only the optimum NA area can be used:

$$NA\text{fiber} \leq NA95 \times (ff/fc).$$

Then, the further condition for ff and fc to block out the laser light is explained.

Among the fluorescence signal passed through the pinhole 216a of the pinhole plate 216 and transmitted through the optical fiber 218, there is included a portion of component laser light reflected and scattered by the sample irradiated by the laser to be excited. Generally, the quantity of the laser light may be larger than the quantity of the fluorescence to be effectively used, so that the fluorescence signal has to be separated in order to effectively use the dynamic range of the detector 237.

In the first embodiment of the present invention, the laser light, which is excitation light having shorter wavelength than the fluorescence, is removed from the detecting area on the detecting surface of the detector 237 and only the fluorescence is detected on the detecting area, so that the laser light is separated from the fluorescence and eliminated. In an optical-fiber-input type spectroscope using in combination with a confocal microscope, even if the diameter of the pinhole of the confocal microscope is 1 to 5 times (up to 10 times) larger than the diameter of the Airy disk, the signal light (fluorescence) passing through the pinhole can be used with high efficiency.

Figure 3:
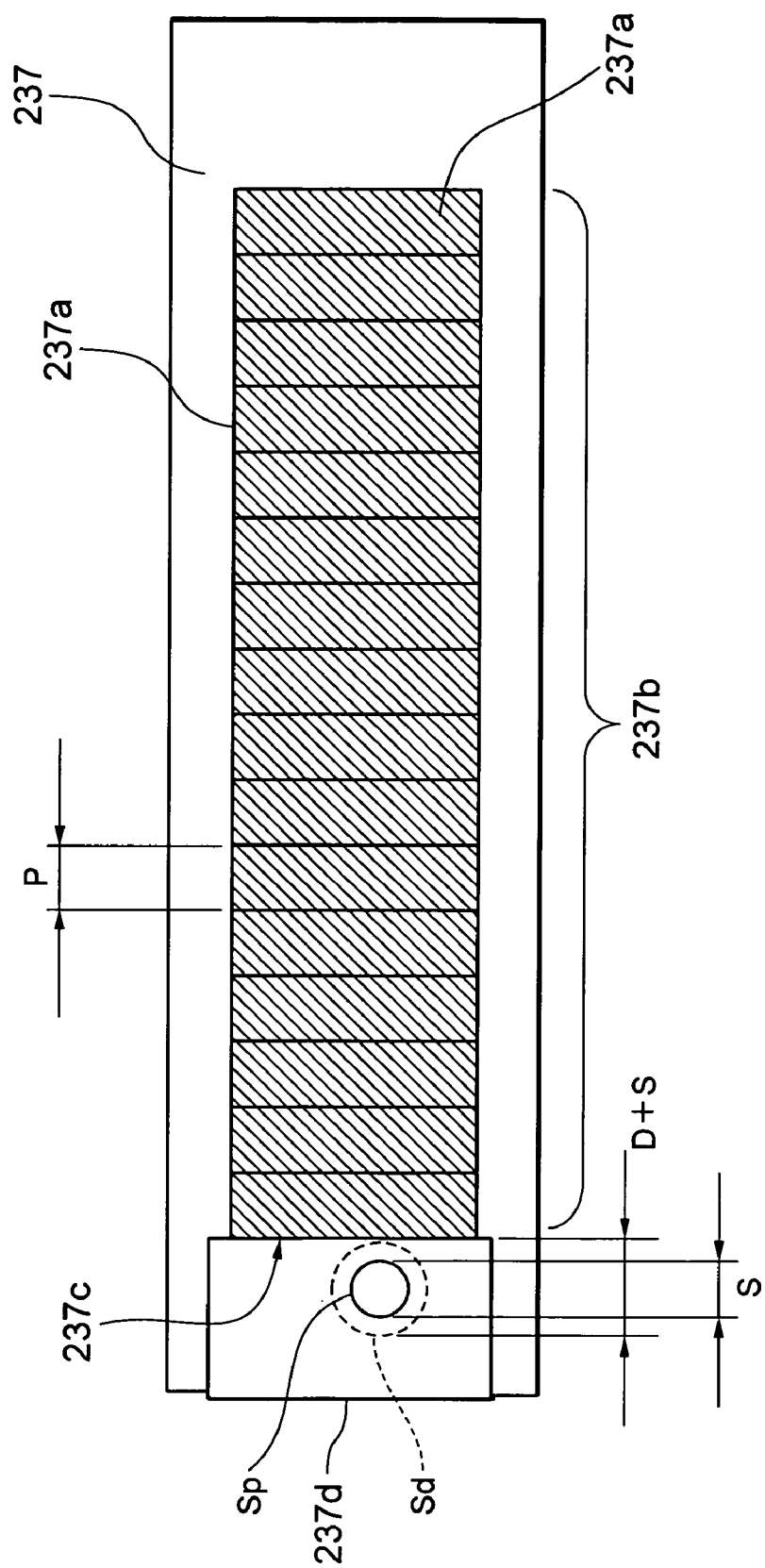
FIG. 3 is an explanatory view showing an example of a configuration of a detector and explaining a relation between a spot diameter of a detected light and an arranging pitch of detector elements.

FIG. 3 is a graph explaining an aspect of focusing the signal light on the detecting surface of the detector. The effective area of the detecting surface is a shaded portion. A shield plate 237d is disposed outside of the effective area such a manner that the light illuminating the shield plate 237d cannot reach the detecting surface. In this case, the laser light is separated from the fluorescence and removed by adjusting the angle of the rotation table 232 to arrange the diffraction gratings 233 through 235 such that the spot Sp of the laser light on the detecting surface focuses on the shield plate 237d.

The useful fluorescence signal is separated from the useless laser light by using the fact that the wavelength of the fluorescence is longer than that of the laser light. However, these wavelengths are commonly close to each other. Accordingly, in order to detect the fluorescence signal whose wavelength is close to that of the laser light, it is effective to bring the position of the shield plate 237d close to the detecting area as well as to make the spot of the laser light smaller.

In the case that the position of the shield plate 237d is brought close to the boundary 237c of the detection area 237b, when the diameter of the spot of the laser light having the wavelength of Lex is the same as the pitch P of the detector elements 237a of the detector 237, the minimum wavelength Lem (the central wavelength of the channel corresponding to the minimum wavelength) of the fluorescence capable of being detected is expressed by the following expression:

$$Lem = Lex + Lp$$

where Lp denotes a wavelength pitch corresponding to the pitch P of the detector elements 237a of the detector.

Actually, the diameter of the spot Sp is preferably smaller than the pitch P of the detector elements 237a of the detector 237 in consideration of aberration of the optical system, fabrication error of the apparatus, repeatability of the movable elements, and the like. In the first embodiment of the present invention, the diameter S of the spot Sp is 500 μm, and the increment D of the diameter of the spot as a result of the above-described errors is assumed to be, for example, ±100 μm (as shown by a dotted circle Sd in FIG. 3), so that the minimum wavelength Lem of the fluorescence capable of being detected is as follows:

$$Lem = Lex + Lp \times (D + S)/P$$
$$= Lex + Lp \times (100 + 500)/1000.$$

Second Embodiment

Figure 4:
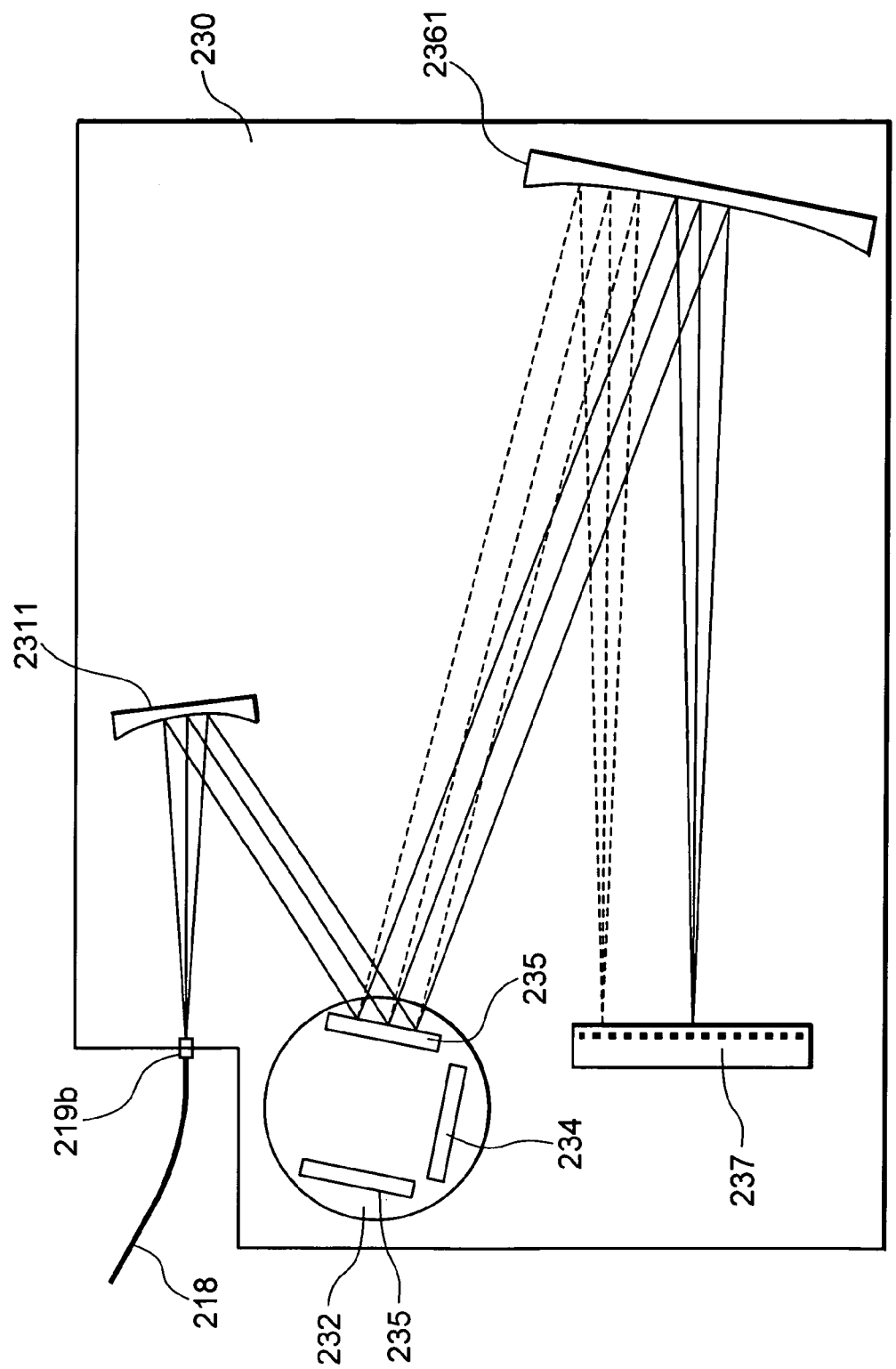
FIG. 4 is an explanatory view showing a collimator optical system and a focusing optical system according to a second embodiment of the present invention.

Then, a second embodiment of the present invention is explained below. In the second embodiment, respective concave mirrors are used as the collimator optical system 231 and the focusing optical system 236 in the spectroscope unit 230. An example is shown in FIG. 4.

In the second embodiment of the present invention, a concave mirror 2311 is used as the collimator optical system 231. The concave mirror 2311 for used as a collimator has a focal length of 30 mm and a diameter of 15 mm, and an object-side numerical aperture is 0.25 which is larger than 0.22 of the numerical aperture of the optical fiber. In this case, the diameter of the collimated bundle of rays becomes about 13.2 mm (30×0.22×2). The dimension of the grating surface of the diffraction grating is 30 mm by 30 mm, which is sufficiently larger than the diameter of the bundle of rays of the signal light even if an angle of incidence is taken into consideration. A concave mirror 2361 used as the focusing optical system 236 has a focal length of 300 mm and a diameter of 15 mm, and is arranged in a position telecentric with respect to a detector 237. The detector 237 is a multi-anode type photomultiplier tube (PMT) with 32 channels, the dimension of each channel is about 0.8 mm by 7 mm, and the respective channels are arranged in the wavelength dispersing direction up to 32 channels with a pitch P (=1 mm). Since the concave mirror for focusing light is arranged in the telecentric position, the dimension of the bundle of rays incident on the whole 32 chs of the detector 237 on the surface of the concave mirror is about 45.2 mm in the dispersion direction and about 13.2 mm in the direction perpendicular thereto, which is smaller than the concave mirror for focusing light. With this configuration, the light having the wavelength range to be detected among the signal light come out from the optical fiber can be effectively led to the detector 237 without being shielded.

When the dimension of the signal light image (the image of the core of the optical fiber) come out from the optical fiber on the detecting surface of the detector is smaller than the dimension of the detector element in the direction of dispersion or the pitch, high spectral resolution corresponding to the number of detector elements can be obtained. Moreover, when aberrations of the optical system is taken into consideration, it is preferable that the dimension of the signal light image is smaller than this. With this configuration, when the magnification from the optical fiber to the detector is assumed to be 10 times, the dimension of the signal light image (the image of the core of the optical fiber) is about 500 μm, so that high spectral resolution can be obtained.

Incidentally, among optical fibers, there is a one whose refractive index distribution of the core is a graded-index type. However, in an optical fiber of this type, the outline of the image of the core formed on the detecting surface is not clear and gets blurred. As a result, cross talk in the direction of spectral resolution becomes worse to degrade spectral resolution, so that it is undesirable. Moreover, there are such types that the material of the optical fiber is a plastic and that a plurality cores are in an optical fiber. However, since a plastic optical fiber shows poor transparency in comparison with an optical fiber of a single core made of a silica glass, and a filler filling the plurality of cores in a multi-core type optical fiber may have peculiar absorption band, it becomes cause of decrease in sensitivity and inaccuracy of spectra, so that it is undesirable. Furthermore, the type of the optical fiber is preferably an FC type connector which shows high positional repeatability. On the other hand, a configuration that the optical fiber is fixed without using fiber connectors may be possible.

As for the concave mirror, an aspherical mirror such as a parabolic mirror may be used. As for the collimator optical system and the focusing optical system, a configuration using two or more reflection mirrors or a configuration using (a) lens(es) in combination with (a) mirror(s) may be used.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A spectroscope comprising:
   an optical fiber on which light is incident;
   a collimator optical system that collimates the light come out from the optical fiber;
   a spectroscopic element that disperses the light collimated by the collimator optical system;
   a detector that is composed of a plurality of detector elements disposed at least in a direction of dispersion and that detects the light dispersed by the spectroscopic element; and
   a focusing optical system that focuses signal light from the spectroscopic element onto a detecting surface of the detector,
   wherein the following conditional expression is satisfied:

$$NAfiber \leq NAf \times (ff/fc)$$

where NAfiber denotes a numerical aperture of the optical fiber, NAf denotes a numerical aperture of the focusing optical system, ff denotes a focal length of the focusing optical system, and fc denotes a focal length of the collimator optical system.

2. The spectroscope according to claim 1, wherein the numerical aperture of the signal light incident on the detector element is denoted by $NAfiber \times (fc/ff)$ which is corresponding to an incident angle range where the detecting sensitivity is 90% or more of the maximum value.

3. The spectroscope according to claim 1, wherein the numerical aperture of the signal light incident on the detector element is denoted by $NAfiber \times (fc/ff)$ which is corresponding to an incident angle range where the detecting sensitivity is 95% or more of the maximum value.

4. The spectroscope according to claim 1, wherein the focusing optical system makes a diameter of a spot of the signal light focused on the detecting surface of the detector smaller than an arranged pitch of the detector elements of the detector.

5. The spectroscope according to claim 1, wherein a numerical aperture of the collimator optical system is larger than that of the optical fiber.

6. The spectroscope according to claim 5, wherein the focusing optical system makes a diameter of a spot of the signal light focused on the detecting surface of the detector smaller than an arranged pitch of the detector elements of the detector.

7. The spectroscope according to claim 5, wherein the collimator optical system includes a cemented lens.

8. The spectroscope according to claim 5, wherein the collimator optical system is composed of a first lens group and a second lens group, the first lens group has positive refractive power, and the second lens group includes a cemented lens for correcting spherical aberration and chromatic aberration generated in the first lens group.

9. The spectroscope according to claim 5, wherein the collimator optical system includes a three-piece cemented lens.

10. The spectroscope according to claim 5, wherein the collimator optical system includes an aspherical mirror.

11. The spectroscope according to claim 5, wherein the collimator optical system includes a parabolic mirror.

12. A microspectroscope comprising:
    an optical fiber on which light come out from a microscope is incident;
    a collimator optical system that collimates the light come out from the optical fiber;
    a spectroscopic element that disperses the light collimated by the collimator optical system;

a detector that is composed of a plurality of detector elements disposed at least in a direction of dispersion and that detects the light dispersed by the spectroscopic element; and a focusing optical system that focuses signal light from the spectroscopic element onto a detecting surface of the detector, wherein the following conditional expression is satisfied:

$$NA\text{fiber} \leq NAf \times (ff/fc)$$

where NAfiber denotes a numerical aperture of the optical fiber, NAf denotes a numerical aperture of the focusing optical system, ff denotes a focal length of the focusing optical system, and fc denotes a focal length of the collimator optical system.

13. The microspectroscope according to claim 12, wherein the optical fiber is a multimode optical fiber.

14. The microspectroscope according to claim 13, wherein the microscope is a confocal microscope that includes on the exit side a pinhole and a relay lens that converges a divergent bundle of rays passed through the pinhole, and the light incident on the optical fiber is fluorescence come out from a microscope sample incident on the optical fiber through the pinhole and the relay lens.

15. The microspectroscope according to claim 12, wherein a numerical aperture of the collimator optical system is larger than that of the optical fiber.

16. The microspectroscope according to claim 15, wherein the optical fiber is a multimode optical fiber.

17. The microspectroscope according to claim 16, wherein the microscope is a confocal microscope that includes on the exit side a pinhole and a relay lens that converges a divergent bundle of rays passed through the pinhole, and the light incident on the optical fiber is fluorescence come out from a microscope sample incident on the optical fiber through the pinhole and the relay lens.

18. The microspectroscope according to claim 15, wherein the focusing optical system makes a diameter of a spot of the signal light focused on the detecting surface of the detector smaller than an arranged pitch of the detector elements of the detector.

19. The microspectroscope according to claim 15, wherein the collimator optical system includes an aspherical mirror.

20. The microspectroscope according to claim 19, wherein the optical fiber is a multimode optical fiber, the numerical aperture of the signal light incident on the detector element is denoted by $NA\text{fiber} \times (fc/ff)$ which is corresponding to an incident angle range where the detecting sensitivity is 90% or more of the maximum value, and the focusing optical system makes a diameter of a spot of the signal light focused on the detecting surface of the detector smaller than an arranged pitch of the detector elements of the detector.

* * * * *